(12) United States Patent
Wood

(10) Patent No.: US 7,059,650 B1
(45) Date of Patent: Jun. 13, 2006

(54) AUTOMOTIVE WINDSHIELD COVER

(76) Inventor: Wesley Wood, 14505 Wood La., Winslow, AR (US) 72959

( * ) Notice: Subject to any disclaimer, the term of this patent is extended or adjusted under 35 U.S.C. 154(b) by 0 days.

(21) Appl. No.: 10/897,812

(22) Filed: Jul. 23, 2004

(51) Int. Cl.
*B60J 1/20* (2006.01)
(52) U.S. Cl. .................................... 296/95.1; 296/97.8
(58) Field of Classification Search .............. 296/95.1, 296/136.11
See application file for complete search history.

(56) References Cited

U.S. PATENT DOCUMENTS

| | | | | |
|---|---|---|---|---|
| 2,624,406 A | * | 1/1953 | Szychowski et al. | 160/370.21 |
| 2,851,303 A | * | 9/1958 | McQueen | 296/95.1 |
| 2,979,129 A | * | 4/1961 | Ketchum | 296/95.1 |
| 3,336,969 A | * | 8/1967 | Marchman | 160/370.21 |
| 3,588,169 A | * | 6/1971 | Lunt | 296/95.1 |
| 3,964,780 A | * | 6/1976 | Naidu | 160/370.21 |
| 4,597,608 A | * | 7/1986 | Duffy | 296/95.1 |
| 4,635,993 A | * | 1/1987 | Hooper et al. | 296/95.1 |
| 4,811,982 A | | 3/1989 | Carlyle | 296/95.1 |
| 4,842,324 A | * | 6/1989 | Carden | 296/95.1 |
| 4,848,825 A | * | 7/1989 | Niernberger | 296/95.1 |
| 4,862,943 A | * | 9/1989 | Shafia | 296/95.1 |
| 4,903,748 A | * | 2/1990 | Foraker | 296/95.1 |
| 4,921,299 A | * | 5/1990 | Herrick | 296/97.8 |
| 4,948,192 A | * | 8/1990 | Sohne | 296/95.1 |
| 4,966,405 A | * | 10/1990 | Tremaine et al. | 296/95.1 |
| 5,004,285 A | * | 4/1991 | Bennett | 296/97.7 |
| 5,031,684 A | * | 7/1991 | Soong et al. | 296/97.8 |
| 5,037,156 A | * | 8/1991 | Lundberg | 296/95.1 |
| 5,123,468 A | * | 6/1992 | Mater, Jr. | 296/95.1 |
| 5,205,604 A | * | 4/1993 | Smith | 296/97.1 |
| 5,356,191 A | * | 10/1994 | Sheehan | 296/95.1 |
| 5,615,923 A | * | 4/1997 | Madison | 296/95.1 |
| 5,697,416 A | * | 12/1997 | Bock et al. | 150/168 |
| 6,015,180 A | * | 1/2000 | Beuerle | 296/95.1 |
| 6,076,577 A | * | 6/2000 | Ontaneda | 296/95.1 |
| 6,513,853 B1 | * | 2/2003 | Langley | 296/95.1 |

* cited by examiner

*Primary Examiner*—Kiran B. Patel
(74) *Attorney, Agent, or Firm*—Keisling Pieper & Scott PLC; David B. Pieper; Trent C. Keisling

(57) ABSTRACT

An automotive windshield cover is taught using a pliable sheet with a central body for covering the windshield and side tabs that may be closed in the gasket seal between the side doors and the door frame. The sheet may include a top flexible tab for extending onto part of the roof of the vehicle and a bottom flexible tab for either extending onto the hood or for insertion into the cowl vent at the bottom of the windshield. The bottom tab is made with a contoured shape that follows shape of the sides of the cowl vent. The cover may also be inserted under the spring biased windshield wipers to be held in place. Tearing stress on the bottom tab is accounted for with a relaxed angle approach on the bottom tab to body connection. Also taught is a method for using the cover.

7 Claims, 5 Drawing Sheets

AUTOMOTIVE WINDSHIELD COVER

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention relates to the field of environmental covers for automobiles in general. In particular, the present invention relates specifically to an environmental cover for an automotive windshield.

2. Description of the Known Art

As will be appreciated by those skilled in the art, a cover may be used to protect the windshield of an automobile. Details of a typical protector for a windshield are contained in U.S. Pat. No. 3,964,780, issued to Naidu on Jun. 22, 1976 and U.S. Pat. No. 4,811,982 issued to Carlyle on Mar. 14, 1989. Each of these patents is hereby expressly incorporated by reference in their entirety.

U.S. Pat. No. 3,964,780, issued to Naidu on Jun. 22, 1976 discloses Snow Protectors for Windshields. This is described as a disposable wind-shield snow protector adapted to be removably adhered to the wind-shield of an automobile, bus, truck and the like including a flexible protection sheet and a backing sheet in overlying relationship to each other. The protection sheet includes a cord reinforcing secured to the rearward side thereof and is affixed to a handle located beyond the periphery of the protection sheet. The backing sheet is adapted to be peeled away from the protection sheet to expose an adhesive coating that adapts the device to be removably secured to any desired wind-shield. Removal by hand is easily facilitated by use of the handle provided. The device is then discarded.

U.S. Pat. No. 4,811,982 issued to Carlyle on Mar. 14, 1989 discloses an Automotive Window Shield and Covering. This is described as an automobile window shield and cover formed of a thin, disposable sheet of strong water resistant paper, plastic, or similar inexpensive material. The sheets are factory cut to approximate the size and shape for various sized automobile (and other vehicle) windows, such as windshields, rear and side windows, and have an adhesive backing which is factory-applied to at least peripheral edge regions of the back to enable the sheets to be adhered to an appropriate automobile window in such a manner as to cover most of it, thereby protecting it against the buildup of snow and ice in winter weather conditions. Peeling the sheet from the window before the automobile is to be driven, thus enables the driver to remove any snow and ice from the window. The sheets may be perforated from one edge to an opposite edge in one or more places, to enable the sheets to be selectively removed in sections or strips, and may be provided in pads of a number of sheets for user convenience.

Thus, it may be seen that these prior art patents are very limited in their teaching and utilization, and an improved automotive windshield cover is needed to overcome these limitations.

SUMMARY OF THE INVENTION

The present invention is directed to an improved automotive windshield cover. In accordance with one exemplary embodiment of the present invention, a windshield cover is provided for in at least four different embodiments. In the first embodiment the cover extends across the windshield, covers a small portion of the roof, extends to cover the wipers, and is secured inside each door. In the second embodiment the cover extends across the windshield, covers the roof all the way back to the rear edge of the front doors, extends to cover the wipers, and is secured inside each door. In the third embodiment the cover extends across the windshield, covers the rear doors and extends to cover the rear windshield, extends to cover the wipers, and is secured inside each door. In the fourth embodiment the cover extends across the rear windshield, covers a small portion of the roof, and is secured inside each rear door.

Advantages of the present invention include: no standing in the cold weather for the scraping of ice; no problems with folding up a used cover which has ice covering it because the cover is disposable, no wasting fuel in heating up the vehicle, the doors of the automobile won't be frozen shut; and not waiting to remove ice or peeling off of the adhesive nature of the cover.

Other embodiments provided by the present invention also provide an improved automotive windshield cover for an automobile. These covers also use a pliable sheet with a central body that will cover the windshield. Two side tabs are adapted to be secured between the side doors and the door frames to hold the cover in place. Additional improvements include the use of a pliable sheet having a non-stick surface, a top tab to effectively overlay the roof of the automobile, and a bottom tab to cover the cowl vent and at least a part of the hood. A method for using the windshield cover is also taught as well as a unique distribution system including a plastic roll distribution for disposable covers.

These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, like reference numerals have been employed throughout wherever possible to indicate like parts in the various views.

DETAILED DESCRIPTION OF THE INVENTION

Figure 1:
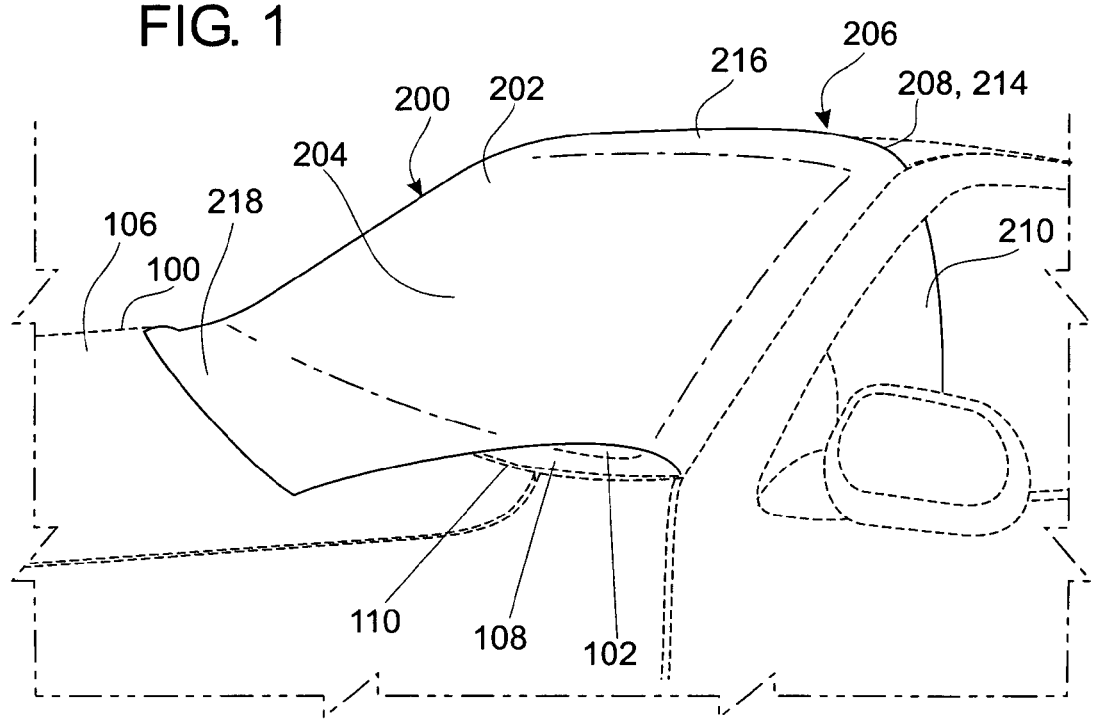
FIG. 1 is a perspective view of an automotive windshield cover on a truck as an exemplary embodiment of the present invention.
Figure 2:
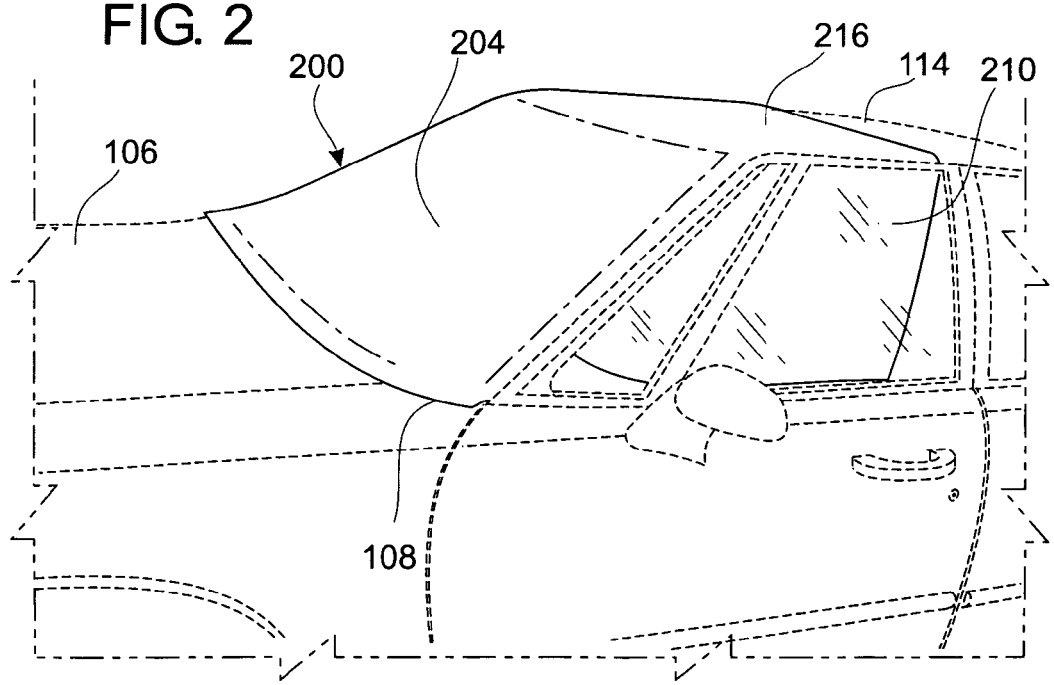
FIG. 2 is a perspective view of an automotive windshield cover on a car as an exemplary embodiment of the present invention.
Figure 3:
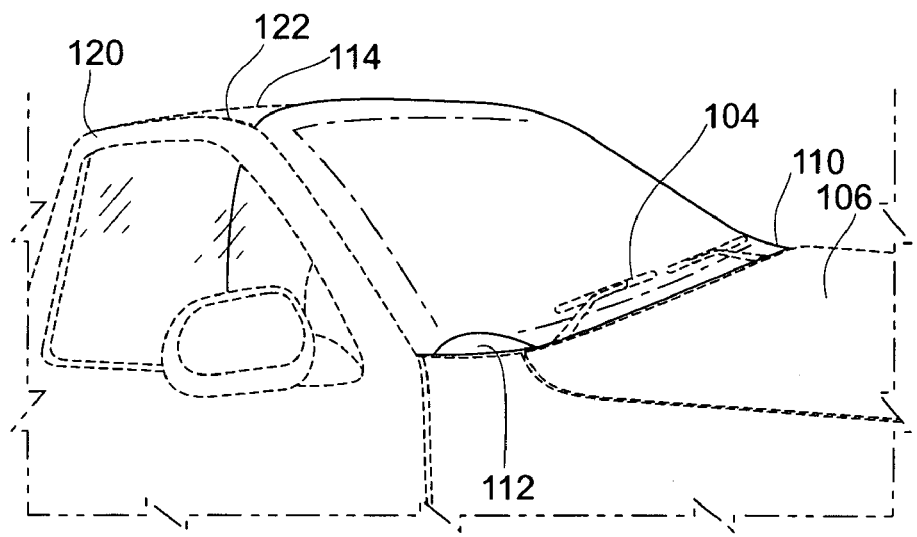
FIG. 3 is a perspective view of an alternative installation of the automotive windshield cover of FIG. 1 shown from the opposite side from FIG. 1.

As shown in FIGS. 1 through 5 and FIG. 9 of the drawings, exemplary embodiments of the present invention are shown as a windshield cover 200 for covering the windshield 102 of an automobile 100. The application of the present invention is for use on an automobile 100. As is well known in the art of automobiles 100, spring biased wipers 104 may be used for removing rain and sleet form the windshield 102. Automobiles 100 are also well known to have a hood 106 with the separation of the hood 106 to the windshield 102 being known as a cowl vent 108. The cowl vent 108 has a left vent side 110 and a right vent side 112. The automobile 100 is also typically constructed with a solid or convertible roof 114. The automobile will also typically have a first side door 116 sealably closing onto a first door frame 118 and a second side door 120 sealably closing onto a second door frame 122.

The present invention is directed to an automotive windshield cover 200 constructed from a pliable sheet 202. The pliable sheet 202 defines a central body 204 which has an environment exposure side 206 and a windshield side 208 with either of both of these providing a non-stick surface 214. Flexibly connected to the central body 204 as a part of the pliable sheet is a first side tab 210 and a second side tab 212 with alternative constructions including either of both of a top tab 216 and a bottom tab 218. The bottom tab is unique in having a contoured shape 220 with a relaxed angle approach 222 so that the bottom tab may fit into the cowl vent 108.

As shown in the drawings, the window cover 200 has a length 262 and a width 264 and is manufactured from a sheet of material having a small mil thickness. Typical thickness is in the range of from 0.74 to 1.5 Mil and depending on the material utilized. The referred embodiment uses a 1.1 Mil thickness, but these numbers should not be interpreted to limit the materials or thicknesses which may be utilized.

Figure 4:
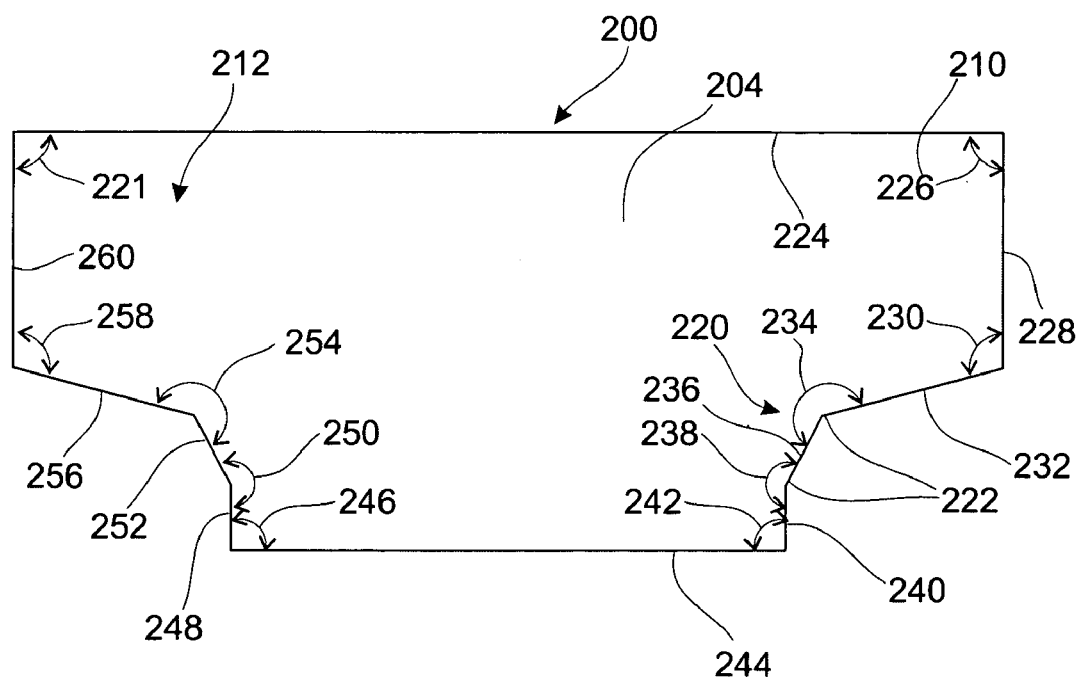
FIG. 4 is a schematic view of the automotive windshield cover of FIG. 1.

FIG. 4 shows one embodiment in which the windshield cover 200 is constructed to define a top edge 224 connected by a top to first side angle 226 to a first side edge 228. The first side edge 228 connects through a first side to contour angle 230 to a first side primary contour edge 232. The first side primary contour edge 232 connects through a first side initial contour angle 234 to a first side secondary contour edge 236. The first side secondary contour edge 236 then connects through a first side secondary contour angle 238 to a first side tertiary contour edge 240. This then provides the connection for the first contour to bottom angle 242 for connecting to the bottom edge 244. Similar to the first side the second side shows how the bottom edge 244 connects through a second contour to bottom angle 246 to a second side tertiary contour edge 248 which connects through a second side secondary angle 250 to a second side secondary contour edge 252. The second side secondary contour edge 252 then connects through a second side primary angle 254 to the second side primary counter edge 256 which is connected through the second side initial contour angle 258 to the second side edge 260. The second side edge 260 is connected through the top to second side angle 221 to the top edge 224.

The following chart provides the length of these components in inches and the angle in degrees:

| Item (with reference number) | Measurement |
| --- | --- |
| a top edge 224 | 105 inches |
| a top to first side angle 226 | 90 degrees |
| a first side edge 228 | 24 inches |
| a first side to contour angle 230 | 100–120 degrees (preferred is 115 degrees) |
| a first side primary contour edge 232 | 18 inches |
| a first side initial contour angle 234 | 130–250 degrees (preferred is 230 degrees) |
| a first side secondary contour edge 236 | 6 inches |
| a first side secondary contour angle 238 | 100–150 degrees (preferred is 105 degrees) |
| a first side tertiary contour edge 240 | 5–10 inches (preferred is 6 inches) |
| a first contour to bottom angle 242 | 90 degrees |
| a bottom edge 244 | 62 inches |
| a second contour to bottom angle 246 | 90 degrees |
| a second side tertiary contour edge 248 | 3–10 inches (preferred is 6 inches) |
| a second side secondary angle 250 | 100–150 degrees (preferred is 105 degrees) |
| a second side secondary contour edge 252 | 6 inches |
| a second side primary angle 254 | 130–250 degrees (preferred is 230 degrees) |
| a second side primary contour edge 256 | 18 inches |
| a second side initial contour angle 258 | 100–120 degrees (preferred is 115 degrees) |
| a second side edge 260 | 24 inches |
| a top to second side angle 221 | 90 inches |

Figure 5:
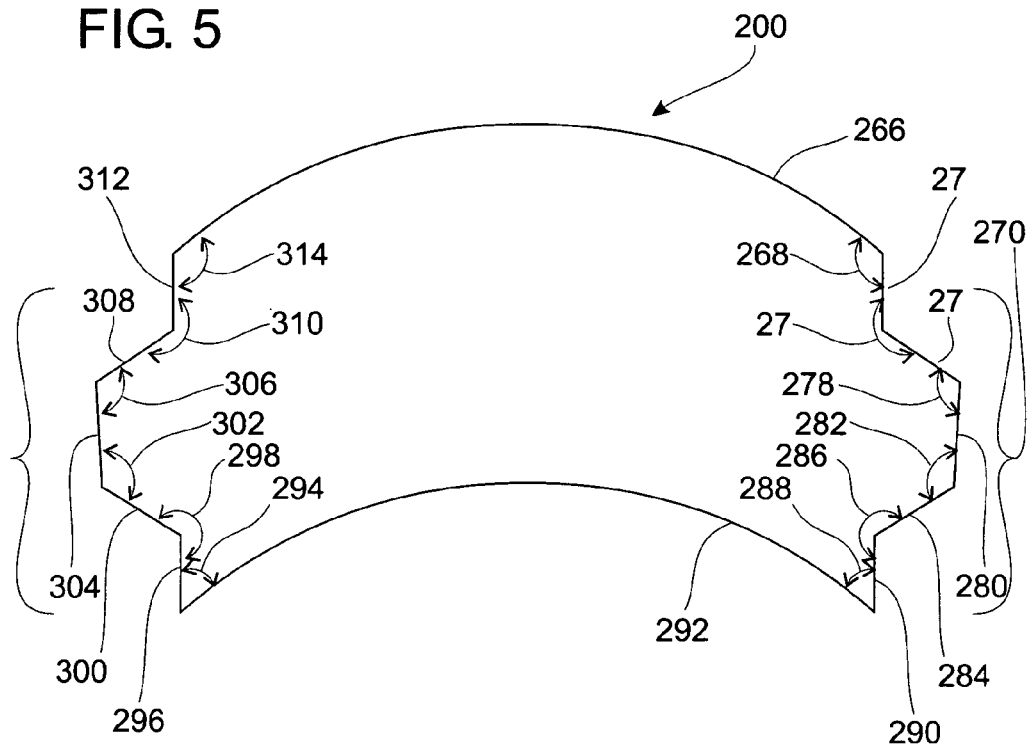
FIG. 5 is a schematic view of the automotive windshield cover of FIG. 2.

FIG. 5 shows an alternative embodiment in which the windshield cover 200 is made with a curved top edge 266. The curved top edge 266 is connected through a top to first side angle 268 to a first body side edge 270. The first body side edge 270 has a first side initial segment 272 which is connected through a first side to tab initial angle 274 to a first side primary tab edge 276. The first side primary tab edge 276 is connected through a first tab primary angle 278 to a first side secondary tab edge 280. The first side secondary tab edge 280 is connected through a first side secondary angle 282 to a first side tertiary tab edge 284. The first side tertiary tab edge 284 is connected through a first tab to side angle 286 to a first side second segment 288. The first side second segment 288 is connected through a first side to bottom angle 290 to a curved bottom edge 292. The curved bottom edge 292 is connected through a second side to bottom angle 294 to a second side second segment 296. The second side second segment 296 is connected through a second tab to side angle 298 to a second side tertiary tab edge 300. The second side tertiary tab edge 300 is connected through a second side secondary angle 302 to a second side secondary tab edge 304. The second side secondary tab edge 304 is connected through a second tab primary angle 306 to a second side primary tab edge 308. The second side primary tab edge 308 is connected through a second side to tab initial angle 310 to a second body side edge 312. Finally, the second body side edge 312 is connected through a top to second side angle 314 to the curved top edge 266.

The following chart provides the length of these components in inches and the angle in degrees:

| Item (with reference number) | Measurement |
|---|---|
| a curved top edge 266 | 50 inch radius having 77 inch width and 18 inch height |
| a top to first side angle 268 | 45 degrees |
| a first body side edge 270 | 40 inches |
| a first side initial segment 272 | 7.78 inches |
| a first side to tab initial angle 274 | 255 degrees |
| a first side primary tab edge 276 | 12.42 inches |
| a first tab primary angle 278 | 105 degrees |
| a first side secondary tab edge 280 | 18 inches |
| a first side secondary angle 282 | 105 degrees |
| a first side tertiary tab edge 284 | 12.42 inches |
| a first tab to side angle 286 | 255 degrees |
| a first side second segment 288 | 7.78 inches |
| a first side to bottom angle 290 | 45 degrees |
| a curved bottom edge 292 | 50 inch radius having 77 inch width and 18 inch height |
| a second side to bottom angle 294 | 45 degrees |
| a second side second segment 296 | 7.78 inches |
| a second tab to side angle 298 | 255 degrees |
| a second side tertiary tab edge 300 | 12.42 inches |
| a second side secondary angle 302 | 105 degrees |
| a second side secondary tab edge 304 | 18 inches |
| a second tab primary angle 306 | 105 degrees |
| a second side primary tab edge 308 | 12.42 inches |
| a second side to tab initial angle 310 | 255 degrees |
| a second body side edge 312 | 7.78 inches |
| a top to second side angle 314 | 45 degrees |

Figure 6:
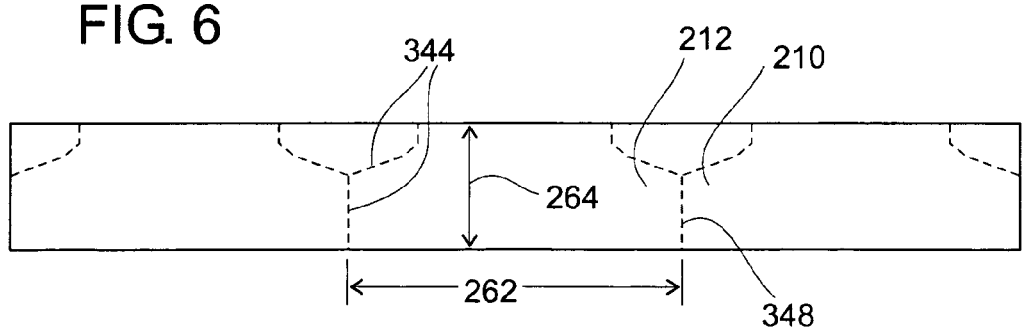
FIG. 6 is a schematic view of an unrolled length of perforated sheeting forming multiple automotive windshields cover of FIG. 1.
Figure 7:
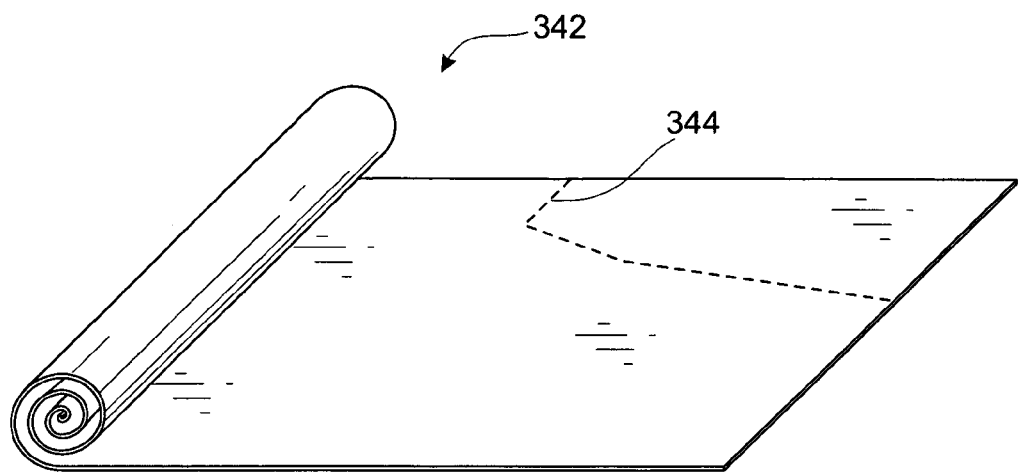
FIG. 7 is a schematic view of the sheet of FIG. 6 in a rolled configuration.

FIGS. 6 and 7 of the drawings show a multiple automotive windshield cover roll 342 with perforations 344 for a side tear line 348. It is also possible to provide a complete cut at the location of the perforations 344 to provide the tear line 348. Note that in the preferred embodiment shown, that the side tear line defines edges of both a first side tab 210 and a second side tab 212.

Figure 8:
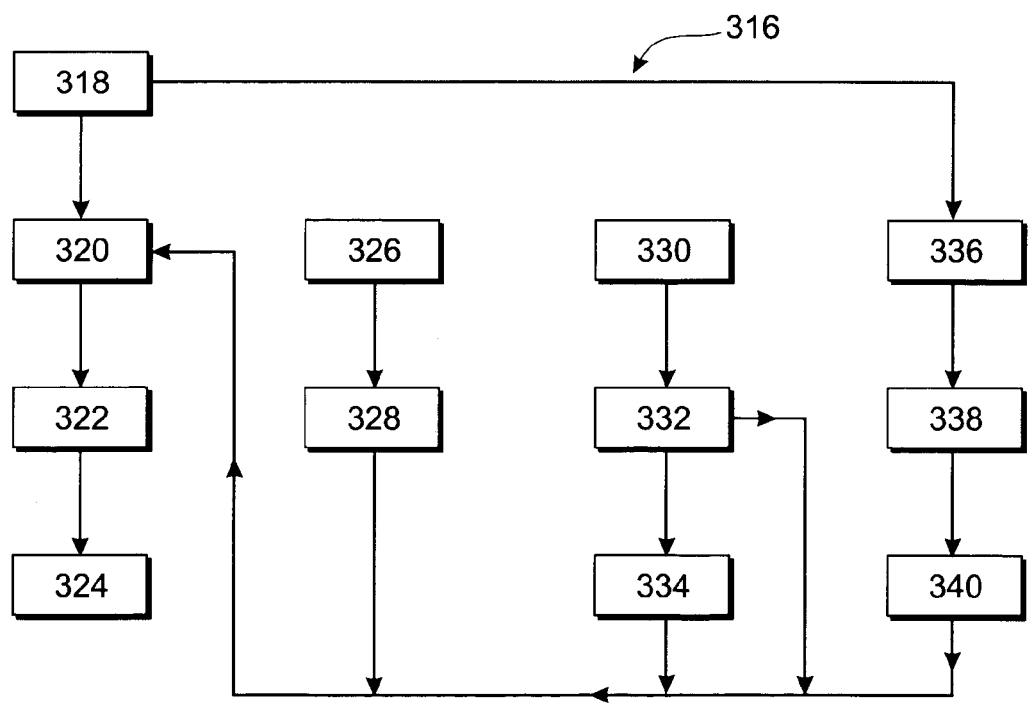
FIG. 8 is a schematic view of one of the method flows for the present invention.
Figure 9:
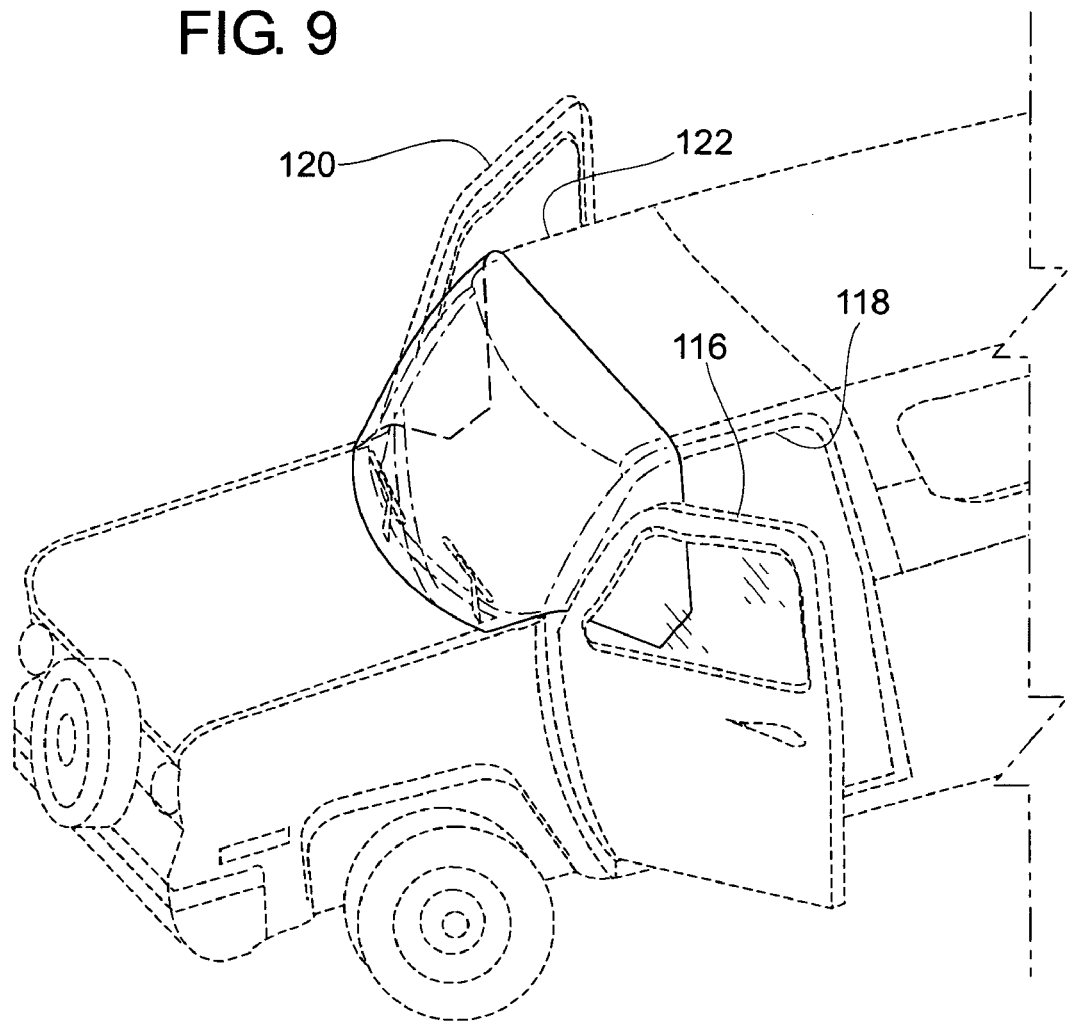
FIG. 9 is a schematic view showing the installation using both doors of the automobile.

FIG. 8 of the drawings shows the main elements of the procedures to be followed for using of the cover 200. As shown in FIG. 8, the basic windshield protection method 316 includes providing a pliable sheet with first and second side tabs 318, covering the automotive windshield 320, securing the first side tab 322, and then securing the second side tab 324. Note that this illustration is not meant to limit these actions to this order, but is provided for illustration of the preferred embodiment. Additional actions may be used within this framework to add additional installation processes to the basic flow. These process may be added anywhere in the original process and are shown inserted after the initial providing step for illustration purposes and not as a limitation on the order or the process steps for any of these processes. The first additional procedure is shown as providing a top tab 326 and then overlaying the top tab 328 onto the roof of the automobile. The next process is providing a bottom tab 330 and then overlaying the bottom tab 332 onto the hood or trunk of the automobile. An additional step can then be provided for inserting the bottom tab into the cowl vent 334. The last shown additional process is for raising the wipers 336, passing the pliable sheet between the wipers and the windshield 338 and then lowering the wipers to capture the pliable sheet 340. These different processes may be combined in whole or in part together to form the basic installation method of the present invention. Removal process may be understood by reversing these installation processes.

Reference numbers used in the corresponding drawings are as follows:
an automobile 100
a windshield 102
spring biased wipers 104
a hood 106
a cowl vent 108
a left vent side 110
a right vent side 112
a roof 114
a first side door 116
a first door frame 118
a second side door 120
a second door frame 122
an automotive windshield cover 200
a pliable sheet 202
a central body 204
environment exposure side 206
windshield side 208
a first side tab 210
a second side tab 212
a non-stick surface 214
a top tab 216
a bottom tab 218
a contoured shape 220
a relaxed angle approach 222
a top edge 224
a top to first side angle 226
a first side edge 228
a first side to contour angle 230
a first side primary contour edge 232
a first side initial contour angle 234
a first side secondary contour edge 236
a first side secondary contour angle 238
a first side tertiary contour edge 240
a first contour to bottom angle 242
a bottom edge 244
a second contour to bottom angle 246
a second side tertiary contour edge 248
a second side secondary angle 250
a second side secondary contour edge 252
a second side primary angle 254
a second side primary counter edge 256
a second side initial contour angle 258
a second side edge 260
a length 262
a width 264
a curved top edge 266
a top to first side angle 268
a first body side edge 270
a first side initial segment 272
a first side to tab initial angle 274
a first side primary tab edge 276
a first tab primary angle 278
a first side secondary tab edge 280
a first side secondary angle 282
a first side tertiary tab edge 284
a first tab to side angle 286
a first side second segment 288
a first side to bottom angle 290
a curved bottom edge 292
a second side to bottom angle 294
a second side second segment 296
a second tab to side angle 298
a second side tertiary tab edge 300
a second side secondary angle 302
a second side secondary tab edge 304
a second tab primary angle 306
a second side primary tab edge 308
a second side to tab initial angle 310
a second body side edge 312 a top to second side angle 314
A windshield protection method 316
providing a pliable sheet with first and second side tabs 318
covering the automotive windshield 320
securing the first side tab 322
securing the second side tab 324
providing a top tab 326
overlaying the top tab 328
providing a bottom tab 330
overlaying the bottom tab 332
inserting the bottom tab into the cowl vent 334
raising the wipers 336
passing the pliable sheet between the wipers and the windshield 338
lowering the wipers to capture the pliable sheet 340
a multiple automotive windshield cover roll 342
perforations 344
side tear line 348

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. An automotive windshield cover for an automobile having a windshield, spring biased wipers, a hood in a spaced relation to the windshield defining a cowl vent with a left vent side and a right vent side, a roof, a first side door sealably engaging a first door frame, and a second side door sealably engaging a second door frame, the cover comprising:
 a pliable sheet;
 the pliable sheet including a central body adapted to cover the automotive windshield;
 a bottom tab flexibly connected to the central body, the bottom tab including a curved bottom edge and a contoured shape adapted to follow the sides of the cowl vent, the contoured shape including a relaxed angle approach to reduce localized stress on the bottom tab to body connection,
 a first side tab flexibly connected to the central body, the first side tab adapted to be secured between the first side door and the first door frame;
 a second side tab flexibly connected to the central body, the second side tab adapted to secure between the second side door and the second door frame;
 wherein the pliable sheet has:
 a first tab to side angle of 255 degrees;
 a first side to bottom angle of 45 degrees;
 a curved bottom edge having a 50 inch radius having 77 inch width and 18 inch height;
 a second side to bottom angle of 45 degrees;
 a second tab to side angle of 255 degrees.

2. The apparatus of claim 1, further comprising:
the pliable sheet having a non-stick surface.

3. The apparatus of claim 1, further comprising:
a top tab flexibly connected to the central body and adapted to effectively overlay at least a part of the roof of the automobile.

4. The apparatus of claim 1, further comprising:
a bottom tab flexibly connected to the central body and adapted to effectively overlay the cowl vent of the automobile.

5. The apparatus of claim 1, further comprising:
a bottom tab flexibly connected to the central body and adapted to effectively overlay the hood of the automobile.

6. The apparatus of claim 1, further comprising:
the bottom adapted to be inserted into the cowl vent.

7. The apparatus of claim 1, further comprising:
the bottom tab adapted to be secured between the spring biased wipers and the windshield.

* * * * *